(12) United States Patent
Kunath et al.

(10) Patent No.: US 11,214,734 B2
(45) Date of Patent: Jan. 4, 2022

(54) MULTI-LUMINESCENT SECURITY ELEMENT AND VALUE OR SECURITY PRODUCT CONTAINING SAID SECURITY ELEMENT

(71) Applicant: BUNDESDRUCKEREI GMBH, Berlin (DE)

(72) Inventors: Christian Kunath, Berlin (DE); Per Krüger, Berlin (DE); Alexander Mombrée, Berlin (DE); Christoph Von Czapiewski, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 195 days.

(21) Appl. No.: 14/783,222

(22) PCT Filed: Apr. 2, 2014

(86) PCT No.: PCT/EP2014/056607
§ 371 (c)(1),
(2) Date: Oct. 8, 2015

(87) PCT Pub. No.: WO2014/166794
PCT Pub. Date: Oct. 16, 2014

(65) Prior Publication Data
US 2016/0053169 A1 Feb. 25, 2016

(30) Foreign Application Priority Data
Apr. 8, 2013 (DE) .......................... 102013206130.7

(51) Int. Cl.
*B42D 25/355* (2014.01)
*C09K 11/59* (2006.01)
(Continued)

(52) U.S. Cl.
CPC ............ *C09K 11/595* (2013.01); *B42D 25/23* (2014.10); *B42D 25/309* (2014.10);
(Continued)

(58) Field of Classification Search
CPC .... C09J 7/02; C09J 2203/338; C09J 2201/24; C09J 7/20; D01F 1/04; D21H 15/10;
(Continued)

(56) References Cited

U.S. PATENT DOCUMENTS

| 3,474,027 A | 10/1969 | Vautrain et al. |
| 4,442,170 A * | 4/1984 | Kaule .................... B41M 3/144 |
| | | 101/DIG. 46 |

(Continued)

FOREIGN PATENT DOCUMENTS

| AU | 2010294594 B2 | 1/2012 |
| DE | 3121523 C2 | 3/1989 |

(Continued)

OTHER PUBLICATIONS

ISO standard 21348, 2004 (Year: 2004).*
International Search Report and Written Opinion in International Application No. PCT/EP2014/056607.

*Primary Examiner* — Jennifer A Boyd
*Assistant Examiner* — Elizabeth M. Dahlburg
(74) *Attorney, Agent, or Firm* — Bonini IP Law, LLC; Frank J. Bonini, Jr.

(57) ABSTRACT

In order to increase the security of value or security documents 100, a multi-luminescent security element 400 is provided which contains at least one first luminescence means 510 and at least one second luminescence means 520. The first luminescence means 510 can be excited under first excitation conditions Sp-1 for the purpose of luminescence, and the second luminescence means 520 can be excited under second excitation conditions Sp-2 for the purpose of luminescence, said second excitation conditions Sp-2 differing from the first excitation conditions Sp-1. The multi-luminescent security element 400 is additionally equipped with at least one absorber means 600 which prevents an (Continued)

Figure 1:
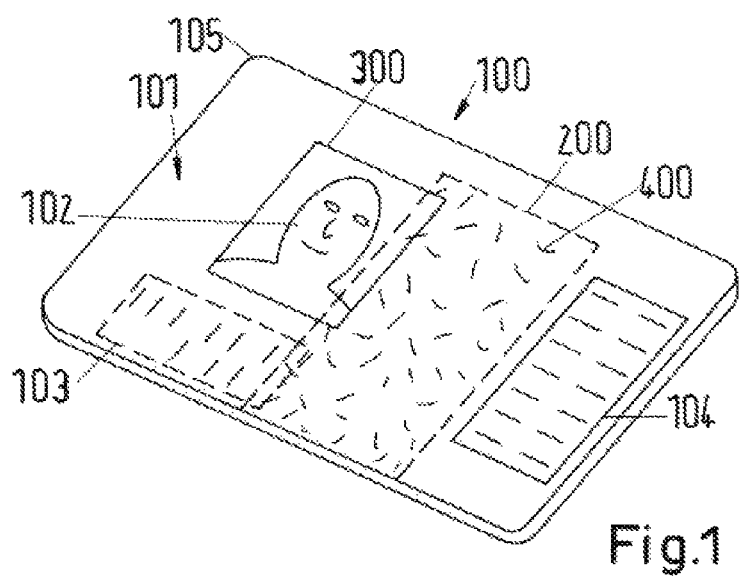

excitation of the at least one first luminescence means 510 under the second excitation conditions Sp-2 for the purpose of luminescence.

11 Claims, 4 Drawing Sheets

(51) Int. Cl.
| | |
|---|---|
| *D21H 21/30* | (2006.01) |
| *D21H 21/40* | (2006.01) |
| *D01F 1/04* | (2006.01) |
| *D21H 21/46* | (2006.01) |
| *D21H 21/48* | (2006.01) |
| *D21H 21/44* | (2006.01) |
| *D21H 15/10* | (2006.01) |
| *D21H 21/42* | (2006.01) |
| *D01D 5/30* | (2006.01) |
| *B42D 25/309* | (2014.01) |
| *C09J 7/20* | (2018.01) |
| *B42D 25/23* | (2014.01) |
| *B42D 25/387* | (2014.01) |
| *B42D 25/36* | (2014.01) |

(52) U.S. Cl.
CPC ........... *B42D 25/355* (2014.10); *B42D 25/36* (2014.10); *B42D 25/387* (2014.10); *C09J 7/20* (2018.01); *D01D 5/30* (2013.01); *D01F 1/04* (2013.01); *D21H 15/10* (2013.01); *D21H 21/30* (2013.01); *D21H 21/40* (2013.01); *D21H 21/42* (2013.01); *D21H 21/44* (2013.01); *D21H 21/46* (2013.01); *D21H 21/48* (2013.01); *C09J 2203/338* (2013.01)

(58) Field of Classification Search
CPC ........ D21H 21/30; D21H 21/40; D21H 21/42; D21H 21/46; D21H 21/48; D21H 21/44; D21H 27/30; D21H 15/06; D21H 21/50; B42D 25/355; B42D 25/29; B42D 25/00; B42D 25/387; B42D 25/47; B42D 25/24; B42D 25/45; B42D 2033/18; B42D 25/23; B42D 25/36; B42D 2035/34; B42D 2035/50; B42D 25/382; B42D 25/378; D01D 5/30; C09K 11/595; B32B 2307/422; B32B 2425/00; B32B 37/12; B32B 37/144; B32B 5/08; B41M 3/14; B41M 3/144; G01N 21/64; Y10T 428/2929; Y10T 428/2931; Y10T 428/2933; Y10T 428/2976; G07D 7/12; G07D 7/122; G07D 7/124
USPC ......... 428/357–401, 916, 221–355 N, 195.1, 428/915; 252/301.16–301.4 H, 252/301.16–301.36, 301.4, 305.5, 301.6, 252/301.6 F; 427/64, 157, 158, 7; 250/458.1–467.1; 283/85, 87, 88, 89, 91, 283/92, 94, 72, 74, 75, 79, 80, 81, 93, 283/101, 107, 108, 109, 110, 114
See application file for complete search history.

(56) References Cited

U.S. PATENT DOCUMENTS

| | | | | |
|---|---|---|---|---|
| 4,451,530 | A * | 5/1984 | Kaule | .............. B41M 3/144 |
| | | | | 101/DIG. 46 |
| 4,756,557 | A * | 7/1988 | Kaule | ................ D21H 21/48 |
| | | | | 283/85 |
| 5,005,873 | A * | 4/1991 | West | ................. G06K 19/14 |
| | | | | 235/491 |
| 6,974,623 | B2 | 12/2005 | Schwenk | |
| 7,845,570 | B2 | 12/2010 | Schwenk | |
| 7,906,201 | B2 * | 3/2011 | Schwenk | ............. B42D 25/29 |
| | | | | 283/72 |
| 8,808,577 | B2 | 8/2014 | Becker et al. | |
| 9,453,162 | B2 | 9/2016 | Kecht et al. | |
| 2002/0014967 | A1 * | 2/2002 | Crane | ........... G06K 19/06196 |
| | | | | 340/572.8 |
| 2002/0160188 | A1 * | 10/2002 | Tam | ................. D21H 21/48 |
| | | | | 428/397 |
| 2006/0249951 | A1 | 11/2006 | Crulkshank et al. | |

FOREIGN PATENT DOCUMENTS

| | | | | |
|---|---|---|---|---|
| DE | 19860093 B4 | 10/2008 | | |
| DE | 2768601 A1 * | 3/2011 | ............. | D01F 1/04 |
| DE | WO 2011029543 A2 * | 3/2011 | ............. | D01F 1/04 |
| DE | 19934436 A1 | 7/2011 | | |
| DE | 102013200895 A1 | 7/2014 | | |

\* cited by examiner

MULTI-LUMINESCENT SECURITY ELEMENT AND VALUE OR SECURITY PRODUCT CONTAINING SAID SECURITY ELEMENT

CROSS-REFERENCE TO RELATED APPLICATIONS

This application is the national phase application of International Patent Application Number PCT/EP2014/056607, filed Apr. 2, 2014 which claims the benefit of German Patent Application Number DE 102013206130.7, filed Apr. 8, 2013, the contents of each are hereby incorporated by reference in their entireties.

The present invention relates to a multi-luminescent security element as well as to a value or security product, in particular a value or security document, containing at least one such security element. A value and/or security document can be, for example, a personal document, in particular a personal identification card, or a means of payment, in particular a bank note. Typically, such documents are produced in standardized formats, for example, in the ID 1-, ID2- or ID3-format according to ISO 7810. In principle, the documents can consist of or contain an organic polymer or a ceramic material, paper, cardboard or metal. Cards and card-like components of book-like documents can be produced preferably from polymer films laminated to one another. For the verification of the authenticity and/or for the coding of information, these documents comprise security features.

For example, the security features used in the value and/or security documents can be used exclusively for demonstrating the authenticity of the documents independently of their type and of their user. Such security features are, for example, guilloche patterns, water marks, embossings, flipped images, holograms, colored fibers, the special paper of bank notes and the like. Individualizing, for example, personalizing security features in addition contain, in coded form or also in plain text, information on the type of the document, on its owner and/or on an item with which the document is associated.

DE 199 62 790 A1 discloses a security paper with applied coding made of luminescent colored fibers. For this purpose, the security paper is provided with two types of colored fibers, which differ with regard to their luminescent properties. In each case, one type of colored fibers is located in a defined partial area of the security paper. The coding is represented by the geometrically defined arrangement of the partial areas and/or by the presence or absence of colored fibers of a certain type. Due to the arrangement of the colored fibers in different partial areas, the colored fibers are easy to locate and the luminescent properties can be measured independently of one another. The colored fibers preferably consist of transparent plastic fibers that are volume dyed with luminescent substances that are largely transparent in the visual spectral range.

From DE 10 2009 040 747 B3, a value or security document with fluorescing colored fibers is known. The colored fibers are marked at least with a first and a second luminescent substance, wherein the first luminescent substance emits a first luminescent light under first excitation conditions and the second luminescent substance emits a second luminescent light under second excitation conditions. The first and second excitation conditions are not identical, and the first and the second luminescent light can differ spectrally. The colored fibers consist at least partially of an adhesive. They have at least a first and a second partial area, wherein the first partial area consists of the adhesive. For example, the first partial area is marked with the first luminescent substance and the second partial area is marked with the second luminescent substance. This results in a spatial separation between the different luminescent areas. For the application of the colored fibers on a film used for the production of the value or security document, said colored fibers are scattered onto the film and after that the adhesive is heated.

The biluminescent colored fibers described in DE 10 2009 040 747 B3 can in fact be excited under different spectral excitation conditions for the purpose of a spectrally different luminescence. However, one disadvantage is that with higher energy excitation radiation both luminescent substances can be excited. As a result, the resulting contrast of the luminescence between the individual partial areas of the fibers is not satisfactory. If the luminescent substances were not contained in different partial areas of the fibers, the emitted radiation would result only in a mixed color, at least in the case of irradiation of the higher energy excitation radiation. In this case, the color tint would be formed by the mixing ratio of the two substances. However, the color purity of each individual substance could not be achieved.

Therefore, the present invention is based on the problem of producing luminescent security elements that produce a brilliant luminescence with different luminescence under different excitation conditions. In particular, an excellent switching effect/color change should be achieved. The luminescence should also be resistant to aging. The security elements should be particularly suitable for value or security products, particularly value or security documents, particularly preferably for value and security cards and above all for security documents based on polycarbonate materials.

To the extent that the term 'value or security product,' which includes value or security documents, is used in the description and in the claims of the present application, it should be understood to mean, for example, a travel passport, a personal identification card, a driver's license or other ID cards or an access control ID, a vehicle registration document, a vehicle title, a visa, a check, a means of payment, in particular a bank note, a check, bank, credit or cash payment card, a customer card, a medical card, a chip card, a company identification document, a credential, a membership card, a gift certificate or purchase coupon, a consignment note or any other credential, a revenue stamp, a postal stamp, a ticket, a (game) token, an adhesive label (for example, for product security) or another product. The product can be a smartcard, for example. The value or security document can be in the ID 1-, ID 2-, ID 3-format or in any other format, for example, in the form of a booklet such as a passport-like object. A value or security product is generally a laminate made of several document layers which are connected flat to one another, exactly in register, under exposure to heat and at elevated pressure. These products should meet the standardized requirements, for example, ISO 10373, ISO/IEC 7810, ISO 14443. The product layers consist, for example, of a support material that is suitable for lamination.

The value or security product can be formed from a polymer which is selected from a group comprising polycarbonate (PC), in particular bisphenol A polycarbonate, polyethylene terephthalate (PET), their derivatives such as a glycol-modified PET (PETG), polyethylene naphthalate (PEN), polyvinyl chloride (PVC), polyvinyl butyral (PVB), polymethyl methacrylate (PMMA), polyimide (PI), polyvinyl alcohol (PVA), polystyrene (PS), polyvinyl phenol (PVP), polypropylene (PP), polyethylene (PE), thermoplastic elastomers (TPE), in particular thermoplastic polyurethane (TPU), acrylonitrile-butadiene-styrene copolymer (ABS) as well as their derivatives, furthermore paper, cardboard, glass, metal or ceramic. The product can be produced from several of these materials. It is made preferably of PC or PC/TPU/PC. The polymers can either be in filled or unfilled form. In the latter case, they are preferably transparent or translucent. If the polymers are filled, they are opaque. The present indications relate both to films to be connected to one another and also to liquid formulations that are applied on a precursor product, such as protective or finishing lacquer. The product is preferably produced from 3 to 12 films, advantageously 4 to 10 films. The films can moreover carry printed layers.

A laminate that has been formed in this manner can be completed by coating on one side or on both sides with the protective or finishing lacquer or with a film. The film can be, in particular, a volume hologram, a film with a surface hologram (for example, a kinegraphic element) or a scratch protection film. Overlay layers formed in this manner protect a security feature arranged beneath and/or they give the product the required resistance to abrasion. Optionally, the security feature can be formed on one of the inner layers.

To the extent that in the description and in the claims of the present application the term 'luminescence' is mentioned, it is understood to mean fluorescence, phosphorescence, and, in particular, both with Stokes and also anti-Stokes shift. Not covered by the term is a remission of absorbed electromagnetic radiation. According to the present invention, the term preferably should be understood to mean photoluminescence.

To the extent that the respective terms are used in the singular form, for example, a 'first luminescence means' or a 'second luminescence means' or an 'absorber means', these terms can in each case also be understood to refer to the plural form, in particular in the sense of 'at least one luminescence means', 'at least one second luminescence means' or 'at least one absorber means', unless explicitly indicated otherwise.

The above-mentioned problems are solved by a multi-luminescent security element, in particular a biluminescent security element, as well as by a value or a security product which contains at least one multi-luminescent security element or on which such a security element is applied.

The multi-luminescent security element according to the invention can be formed, for example, in the form of a filament or a group of filaments, in particular in the form of a fiber, more preferably in the form of a colored fiber, or also in the form of a security thread. Alternatively, the security element can also be formed by planchettes. Such types of security elements can also be integrated in the interior of the product. The security element according to the invention can also be a transfer element, for example, a sticker, a label or the like, which is non-detachably connected to a precursor product of a value or security document in order to produce the value and/or security document. Such elements can be applied on the surface of the document or integrated in the interior of the document.

According to the present invention, the multi-luminescent security element contains at least one first luminescence means, which can be excited to luminescence under first excitation conditions. Furthermore, the security element contains at least one second luminescence means, which can be excited to luminescence under second excitation conditions, which differ from the first excitation conditions. In addition, the luminescence means can also differ from one another with regard to their emission behavior. For example, the at least one first luminescence means can comprise a first luminescence spectrum and the at least one second luminescence means can comprise a second luminescence spectrum, which are identical or preferably different in particular with regard to the spectral distribution of the emission intensity. Furthermore, additional luminescence means can also be contained, whose excitation conditions differ from those of the at least one first and the at least one second luminescence means. The luminescence spectra of these other luminescence means can also be identical or different in comparison to those of the at least one first and the at least one second luminescence means. In the multi-luminescent security element, at least one absorber means is contained additionally, which prevents an excitation to luminescence of the at least one first luminescence means under the second excitation conditions, but not under the first excitation conditions. This means that the at least one absorber means is designed in particular to absorb electromagnetic radiation (at least also) in a spectral range (second excitation conditions) in which the at least one first luminescence means absorbs, so that it is not excited to luminescence. If more than two luminescence means are present, multiple absorber means can also be present, each selectively preventing the excitation of a luminescence means associated with this respective absorber means, by absorbing electromagnetic radiation in other spectral ranges than in the spectral range in which the excitation radiation for the luminescence means associated with it is located.

The first excitation conditions preferably include that the first luminescence means absorbs radiation at a lower energy than the second luminescence means.

It is preferable if the at least one first luminescence means and the at least one second luminescence means as well as optionally additional luminescence means are contained in respective element areas that are spatially separate from one another, i.e., the at least one first luminescence means is located exclusively in a first element area and the at least one second luminescence means is located exclusively in a second element area. If additional luminescence means are present, for example, at least one third luminescence means, at least one fourth luminescence means, etc., additional element areas can also be provided, in which the corresponding other luminescence means of one type are located. It is understood that, in this preferred embodiment, the luminescence means are located exclusively in their respective element area, but not in an element area of the respective other luminescence means. Due to the spatial separation of the luminescence means into different element areas, an additional improvement of the color contrast between the luminescence means is achieved.

In principle, the possibility also exists that the first, second and optionally other luminescence means are located in areas that are not spatially separate from one another but in the same volume areas, i.e., that the first luminescence means is located not only in the first element area but also in the second element area and/or that the second luminescence means is located not only in the second element area but also in the first element area. The same applies to third and even other luminescence means. However, it is preferable if the first luminescence means is located exclusively in the first element area, while the second luminescence means can be contained both in the first and also in the second element area. The same applies to other luminescence means. In addition, it is conceivable that some luminescence means, for example, a first and a second luminescence means, are located in a common volume area, and other luminescence means are contained in volume areas that are separate therefrom and in each case also separate from one another.

Such security elements can be used preferably in value or security products, for example, in cards or paper-based documents such as bank notes.

Biluminescence (or more generally multi-luminescence) can be used as security feature in value or security products. Biluminescence is understood to mean a luminescence effect which, in the case of the change of the excitation light, leads to a modified luminescence emission. For example, when excited with UV-A radiation, a feature lights up in green and when excited with UV-B radiation it lights up in orange. When biluminescent security features are used, two luminescent substances which have a different excitation behavior can be mixed. Most luminescence means used for value or security products have an excitation spectrum, i.e., an absorption spectrum for the electromagnetic radiation used for the excitation to luminescence, which has a spectral course which, starting from a more or less pronounced low-energy threshold value, proceeds substantially continuously to higher energy values (edge absorber). Without the absorber means, in the case of an excitation of the first luminescence means, when two different luminescence means with different excitation behaviors are used, for example, in different volume areas of the value or security product or also in the same volume area, the second luminescence means would in fact not be excited by means of a low-energy (longer wavelength) radiation suitable for this purpose. On the other hand, without the absorber means, a higher energy (shorter wavelength) radiation suitable for the excitation of the second luminescence means would also be absorbed by the first luminescence means, so that, under these conditions, the latter means would be excited to luminescence together with the second luminescence means. As a result, the color contrast between the two volume areas would be low, for example, even if the two luminescence means are located in different volume areas of the product. If the two means are in the same volume area, this would only result in a mixed color under the last-mentioned excitation conditions. In this case, the color tone is determined by the ratio of the two luminescence substances. However, a color purity of the individual luminescence means cannot be achieved under these conditions. In order to solve this problem, the mixing ratio of the two luminescent substances could be adjusted in a suitable manner. For example, the luminescent substance excited by the two excitation radiations could be used in a lower quantity and the other in a higher quantity. However, as a result, the flexibility of the design of the security feature is clearly limited.

By the additional use of the absorber means, it is now prevented that the first luminescence means is excited to luminescence under the excitation conditions under which the second luminescence means can be excited to luminescence, wherein the excitation to luminescence of the first luminescence means by means of a radiation that is suitable for this purpose in any case does not lead to the excitation of the second luminescence means, since this radiation has insufficient energy. Therefore, the second luminescence means can also be located in the same element area as the first luminescence means, without negatively affecting the selectivity of the excitation to luminescence. The use of the absorber means results in the essential advantage that an excellent color contrast between two areas of the product is achieved, each of which contains one of the two luminescence means and that, by excitation to luminescence, the pure luminescent colors are achieved. By means of the present invention, luminescent colors are also obtained which are more saturated than without the use of an absorber means. This can also be seen in a larger separation of the respective color coordinates in the CIE-xy-color space or in another color space. By the implementation of the invention, it is possible, in addition, to select the luminescent substances independently of one another, since an influence due to the presence of the at least one absorber is ruled out. Therefore, material combinations are also possible. This leads to a great flexibility with regard to the selection of the luminescence means and of their quantitative ratios.

For the purposes of the present invention, it is completely sufficient that the absorber means is contained in the multi-luminescent security element in such a manner that irradiated excitation radiation for the second luminescence means does not lead to the excitation to luminescence of the first luminescence means. For example, the absorber means can be in the same volume area in which the first luminescence means is also located. Or the absorber means is contained in a volume area in the security element which shields the volume area in which the first luminescence means is located. For this purpose, the absorber volume area can completely surround the volume area of the first luminescence means or at least shield it to the side from which the observer observes the security element and/or from which the excitation radiation is irradiated onto the security element. Based on this, in a preferred variant of the present invention, the first element area can contain the at least one absorber means. Or the first element area can be surrounded by a shielding area containing the at least one absorber means. The same also applies to the case where not only a first and a second but also other luminescence means are contained.

Thus, an aging-resistant, multi-luminescent security element, in particular an aging-resistant multi-luminescent colored fiber, is created. The presence of the absorber means results in an excellent switching effect or color change, if the excitation radiation is selected in each case in order to selectively excite to luminescence one of the luminescence means. The security element according to the invention can consist, in particular, of polycarbonate and/or it can be suitable for value or security products, particularly value or security documents, which consist at least predominantly of polycarbonate.

The element areas can be formed from the material which forms the matrix (the main component) for the respective at least one luminescence means. This material can be one of the materials mentioned for the value or security product. For the use of the security element according to the invention, the preferred materials are indicated further below. The element areas can be formed from various materials. For example, one of the materials can form the at least one absorber means which is needed in order to prevent the excitation to luminescence of the at least one first luminescence means with excitation radiation for the at least one second luminescence means.

The first and the second and optionally other luminescence means can each be formed from a single luminescent substance or also from mixtures of several luminescent substances. In the same way, the absorber means can be formed by a single absorber substance or by a mixture of several absorber substances.

Such luminescent substances are known. They are preferably substances that emit luminescence radiation in the visible spectral range (400 to 780 nm). In principle, it is also possible that the luminescence radiation is located in other spectral ranges than the visible range, for example, in the UV or IR range, in particular the NIR range. Furthermore, these substances absorb excitation radiation preferably in the UV spectral range, for example, in the UV-A (380 to 315 nm), UV-B (315 to 280 nm) or UV-C spectral range (280 to 200 nm). In principle, it is naturally also conceivable to use luminescent substances that absorb radiation in the visible or IR spectral range. In the latter case, when the luminescent substances emit luminescence radiation in the visible spectral range, they are substances with anti-Stokes shift.

The luminescent substances can preferably be in the form of pigments. For the luminescent substances, reference is made to the pertinent literature, for example, to 'Phosphor Handbook', 2nd Edition, ISBN: 0-8493-3564-7. The disclosure content of said handbook pertaining to these substances is included herewith in the present application. Moreover, typical luminescent substances are also indicated, for example, in DE 10 2009 040 747 B3, U.S. Pat. No. 3,474, 027 A, DE 198 60 093 A, DE 199 34 436 A1, DE 10 2010 026 627 A1 and DE 10 2007 035 592 A1. Their disclosure content is also included herewith in the present application. For example, the luminescent substances can be host matrixes doped with rare earths as luminophores. These substances can have a perovskite or garnet structure, for example. In particular, terbium, cerium and/or europium doped substances are suitable, for example, oxysulfides and oxynitrides. In principle, it is also possible to use phosphates, for example, calcium or strontium phosphates, silicates, for example, zinc or alkaline earth silicates, silicates and aluminates of rare earths, tungstates of alkaline earth metals, zinc oxides, zinc sulfides and oxides of rare earths, which are doped with $Eu^{2+}$, $Eu^{3+}$, $Sb^{3+}$, $Mn^{2+}$, $Ag^+$, $Cu^+$, $Sn^{2+}$ or $Tb^{3+}$ or also other elements (heavy metal ions). The pigments formed therewith can be coated, in addition, with organic substances, in order to increase the quantum yield of the luminescence. Furthermore, quantum dots can also be used, for example, semiconductor particles whose size is in the nm range, based on CdS, for example. Luminescent substances are available, for example, under the trade name Lumilux® from Honeywell, such as Lumilux® CD740 (red) and Lumilux® CD702 (green). As other substances, chelates of rare earth elements can also be considered. Furthermore, organic luminescent substances can also be used, such as rhodamine 6G, rhodamine B, methylene blue, anthrazine, quinazolone, benzoxazine or fluorescein.

The absorber means can be formed in the usual way by substances that absorb the electromagnetic radiation in the spectral range that is used for the excitation to luminescence, for example, UV radiation in one of the three abovementioned UV spectral ranges. The at least one absorber means itself has no luminescence properties. For example, it can consist of inorganic substances such as semiconducting oxides, for example, $TiO_2$, $ZnO$, $ZrO_2$, $Fe_2O_3$ and $CeO_2$. In principle, organic substances such as benzotriazole, bisoctrizole (methylene bis-benzotriazolyl tetramethylbutylphenol) and bemotrizinol (bis-ethylhexyloxyphenol methoxyphenyl triazine) can also be used. The mentioned substances absorb electromagnetic radiation in the UV range.

In another preferred embodiment of the present invention, the first element area contains the at least one absorber means, or the first element area is surrounded by a shielding zone containing the at least one absorber means. In the first of these two variants, the first luminescence means and the absorber means are located in the same volume area of the security element, and in the second variant they are located in different volume areas, wherein, in the latter case, an absorption of the irradiated electromagnetic radiation is achieved in that the first element area in which the first luminescence means is located is surrounded by the shielding area, for example, in the form of a sheathing or shell.

In an additional preferred variant of the present invention, a second element area sheathes at least one other (first) element area. The sheathing second element area is characterized in that at least one second luminescence means is contained in it, which cannot be excited to luminescence by the first (low energy) excitation radiation which is suitable for the excitation of the first luminescence means located in the at least one sheathed first element area, but can only be excited by second (higher energy) excitation radiation. The first excitation radiation, which is suitable for the excitation of the first luminescence means contained in the sheathed first element area, can, in this case, penetrate the sheathing without absorption through the external second luminescence means and thus their excitation. On the other hand, the second excitation radiation, which is suitable for the excitation of the second luminescence means contained in the sheathing second element area, cannot excite to luminescence the internal first luminescence means if the at least one absorber means is contained in the internal first element area.

In another preferred variant of the present invention, the security element is formed at least partially by an adhesive (adhesion promoter). As a result, the security element can be attached to a substrate, for example, a product layer, in particular a document layer, or to the value or security product. The adhesive can form, for example, one of the element areas or a shielding area. The adhesive can be a hot melt adhesive or a reactive adhesive. The adhesive can also contain, for example, at least one polymer which is already tacky at room temperature, or it can be formed by such a polymer. If the adhesive is a hot melt adhesive, it contains at least one polymer which becomes tacky only at elevated temperature, for example, of 50° C. to 200° C., preferably 80° C. to 120° C. A reactive adhesive contains at least one polymer which at first is not cured, and which is then cured under exposure to electromagnetic radiation, which leads to the solid connection to a substrate surface. For example, the adhesion promoter can be a lacquer, for example, a lacquer based on acrylic resin. The acrylic resin can cure under UV radiation. The adhesion promoter can also cure by mechanical pressure application, for example, when a suitable cyanoacrylate adhesive is used. The adhesive can be transparent or translucent or opaque. If the adhesive contains a luminescence means which does not absorb in the visible spectral range, the adhesive is also preferably transparent or translucent in this spectral excitation range. In this case, the adhesive forms an element area.

In another preferred variant of the present invention, the security element is formed by a filament which comprises at least two element areas successively in the longitudinal direction of the filament and/or at least two element areas arranged concentric to one another. In the first of these two variants, the element areas can alternate in the axial direction (in the longitudinal direction of the filament). If a first element area is marked A (with a first luminescence means contained therein) and a second element area is marked B (with a second luminescence means contained therein), the element areas can follow one another in the axial direction as follows ABAB . . . or AB0AB0AB0 . . . or A0B0A 0B0 . . . , where "0" denotes a filament area without luminescent substance, or in yet another manner. The same applies to three different luminescence means A, B, C with corresponding luminescence means contained therein (for example, as follows ABCABC . . . or ABCBABCBA . . . or in yet another manner) or to four, five or more different element areas with corresponding luminescence means. If two element areas arranged concentrically to one another are present, one of the element areas can be formed by an inner strand and a second element area can be formed by an area surrounding the first mentioned element area, wherein the latter mentioned element area can completely sheathe the first element area, for example, in the longitudinal direction. In this case, the inner element area can contain, for example, the first luminescence means, and the outer element area can contain the second luminescence means. The absorber means is preferably contained in the inner element area.

In yet another embodiment, several filaments forming a (filament) strand can also form in each case one of the element areas. These filaments can extend parallel to one another and then they can be connected, for example, in the longitudinal direction to one another, or they can be interwoven with one another forming a yarn. Accordingly, in yet another preferred variant of the present invention, the security element according to the invention is formed by at least two filaments connected to one another, of which at least one preferably forms an adhesive area in filament form, or the strand is sheathed by an adhesive area. At least some of the at least two filaments, including the adhesive area, form in each case an element area in this embodiment. For example, a filament forming a first element area can also comprise an inner area and a sheathing surrounding the inner area. The strand can be formed from two, three, four or more filaments.

Such multifilaments are easy to produce by production in an extrusion method with nozzles having multiple openings. For example, the security element can be formed by a multifilament with three strands, of which one is an adhesive strand. The two other strands form a first element area which contains the first luminescence means and a second element area which contains the second luminescence means. An additional embodiment of such multifilaments consists in arranging two or optionally more than two filaments parallel to one another and in then coating this multistrand with an adhesive sheathing. Each of the individual filaments of the strand can form an element area with a respective luminescence means. The absorber means can then be located, for example, in the adhesive sheathing or in the corresponding element area.

In yet another preferred variant of the present invention, the first excitation conditions include the irradiation of electromagnetic radiation in the UV-A range, and the second excitation conditions include the irradiation of electromagnetic radiation in the UV-B and/or UV-C range. A verification of a security element formed in this manner is exceedingly easy, since it is possible to work with two conventional radiation sources, namely a first UV-A radiation-generating radiation source and a second UV-B and/or UV-C radiation-generating radiation source.

In the case of an element area which contains a luminescence means that can be excited by UV-C radiation, one must ensure that said element area is located in the immediate vicinity of the surface or on the surface of the value or security product, since this excitation radiation would otherwise be completely absorbed in the product without reaching the second luminescence means.

In or on a value or security product, several types of security elements according to the invention can be located, which differ with regard to their shape, color (absorption/remission in the visible spectral range) or precisely in the selection of the luminescent substances. For example, the product can contain two types of security elements according to the invention, of which a first type contains, for example, two luminescence means with absorption and luminescence spectra of types A and B as well as with an absorber means I, and a second type, for example, contains three luminescence means with absorption and luminescence spectra of types B, C and D as well as two absorber means I and II. Other combinations are also possible.

A particularly advantageous design of the present invention consists in that the security element according to the invention is formed by colored fibers. Such fibers are embedded, for example, in the paper matrix in paper manufacturing, or they are applied to at least one layer of a multi-layer product to be formed by lamination, for example, so that they are fixed between the layers during the lamination. Such fibers have a diameter, for example, of 20 to 150 µm, preferably 50 to 60 µm, and a length, for example, of 2 to 25 mm, preferably 5 to 8 mm, most preferably 6 mm. They can be characterized based on their cross section. For example, the cross section can be round, in particular circular or oval, or it can be defined by a polygon, in particular a triangle.

The colored fibers can be produced, for example, from polyamide or from a polyamide copolymer. In particular, the polyamides PA12, PA6 or PA6.6 can be used. Moreover, the colored fibers can also be produced from polyethylene (PE), polyethylene terephthalate (PET), polyvinyl chloride (PVC), cellulose or their derivatives, for example, viscose or cellophane. Polyamide is preferable since it has the lowest interaction with the conventional laser systems used for personalizing value or security documents and thus it does not itself blacken during a laser personalizing. In addition, when PA is used for the colored fibers, the product material blackens due to exposure to a laser beam even in those areas in which such colored fibers are located. The element areas of the colored fibers can be formed, in each case, from the same material or from different materials. For example, the material of the first element area or of a sheathing surrounding this element area can form the at least one absorber means.

Multiple security elements according to the invention can form a security feature in a plane on or in a value or security product by being distributed in one or more delimited areas of the product or in an area encompassing the entire product. The colored fibers or planchettes are arranged on or in the value or security product, preferably in an unordered distribution with regard to their position and alignment. They can be arranged on the surface of a film which is processed with other films to form a product, in spatially structured surface areas, so that these security elements are present in this spatial structuring in the product. For example, these security elements are applied in the form of strips on the film, resulting in strip-shaped areas on the film where such security elements are present and in other areas where there are no such security elements. Within the strips or other surface areas, the security elements are arranged in an unordered distribution. Moreover, these security elements can also be on the surface arranged in several strips that are in a spatial relation to one another. These strips can form a barcode, for example. Different security elements can be in different strips. These security elements can differ from one another in terms of their shape, color or the luminescence means and absorber means contained in them. For example, a first type of security element can be contained in a first strip and a second type in a second strip, a third type in a third strip, etc., for example, as follows ABCDE . . . , wherein A, B, C, D and E each indicate a type of security element in a strip. Alternatively, the security elements can also be arranged in the sequence ABAB . . . or ABC ABC . . . . Moreover, the areas in which there are such security elements can form a pattern, for example, an emblem, seal, logo or another representation. Another type of security element can then, in addition, occupy the entire surface of the product.

For the production of security elements according to the invention in the form of colored fibers, several polymers that contain the luminescence means and absorber means suitable for this purpose, in each case in the desired combination, can be processed in an extrusion process to produce polymer filaments, wherein, for example, several polymer filaments parallel to one another or one or more interior polymer filaments and an external sheathing of these polymer filaments with an additional polymer or adhesive are formed, by simultaneously pressing the polymers through appropriately arranged spinnerets. For the production of a strand which has a core and a sheathing, several outer spinnerets are provided for the production of the sheathing as well as central spinnerets for the production of the internal filaments, wherein the outer spinnerets are arranged around the central spinnerets. For the production of the colored fibers, the strand is cut into short pieces.

The substrate onto whose at least one surface the security elements are applied and to which they are attached can be combined together with other substrates, for example, other polymer films or other film-like materials such as paper, as layers to form a stack, so that the surface(s) provided with the security elements are arranged outside and/or inside. The latter arrangement is advantageous, since counterfeiting or falsifying the product can then be achieved only with great difficulty, since the plane(s) in which the security elements are located would have to be uncovered for this purpose. If the stack is welded by introducing heat and compressive force to form a monolithic laminate, the security elements preferably also melt together with the material that surrounds them, so that delamination is made even more difficult. If the security elements are located on the outside of the laminate after the lamination, they can be protected by subsequent coating with a protective lacquer or with a protective film against manipulations. In addition, this protective lacquer or this protective film is used for protecting the product from mechanical damage (scratching) during use. Furthermore, on the outside, a diffractive film can also be applied. If the substrate and other substrate layers are formed from polycarbonate, the lamination is carried out typically in a hot/cold lamination press in a first step at 170 to 200° C. and at a pressure of 50 to 600 N/cm$^2$ and in a second step with cooling to approximately room temperature and at the same pressure. In the case of polyethylene terephthalate, the lamination occurs at a higher temperature, for example, 220° C. Typically, the polymer films have a thickness of 25 to 150 µm, preferably 50 to 100 µm.

If the at least one substrate surface overlaid with the security elements is located inside the value and/or security product, at least those parts of the product located, from the point of view of the observer, between the at least one substrate surface and said observer are preferably transparent or at least translucent and furthermore preferably colorless or optionally only slightly colored in order to make it possible to recognize the at least one surface area with the security elements. By contrast, product material located on the side of the substrate material opposite to the side on which the security elements are arranged can also be opaque and optionally colored. This product material located on the other side can alternatively naturally also be transparent or translucent and colorless.

In addition to the security feature formed by the security elements, the value and/or security product according to the invention can comprise at least one additional security feature, which is either individualizing or not individualizing. As additional security features one can consider using guilloche patterns, water marks, embossings, a security thread, microscript, flipped images, holograms, optically variable pigments, luminescent paints, a transmitted light passer and the like. Furthermore, the product can also comprise electronic components, for example, an RFID circuit with antenna and RFID microchip, electronic display elements, LEDs, touch-sensitive sensors and the like. The electronic components can be arranged so that they are hidden, for example, between two opaque layers of the product.

Figure 3:
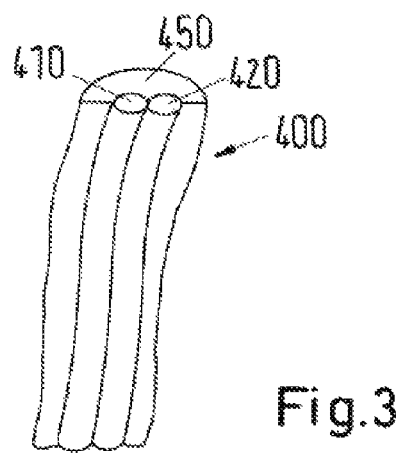
Figure 4:
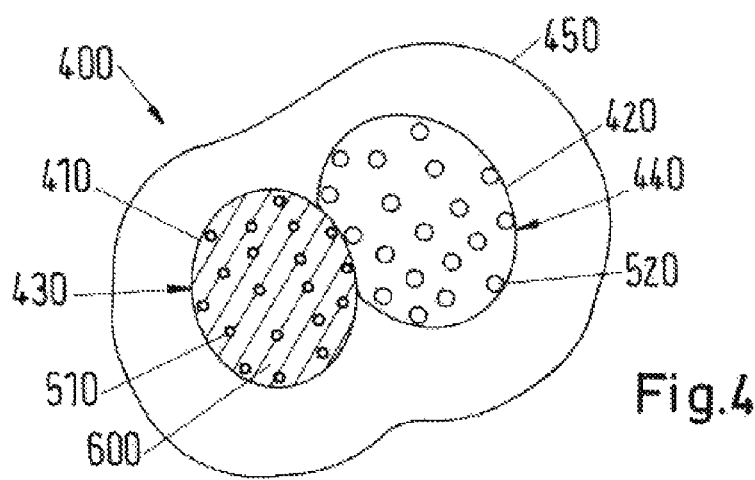
Figure 1A:
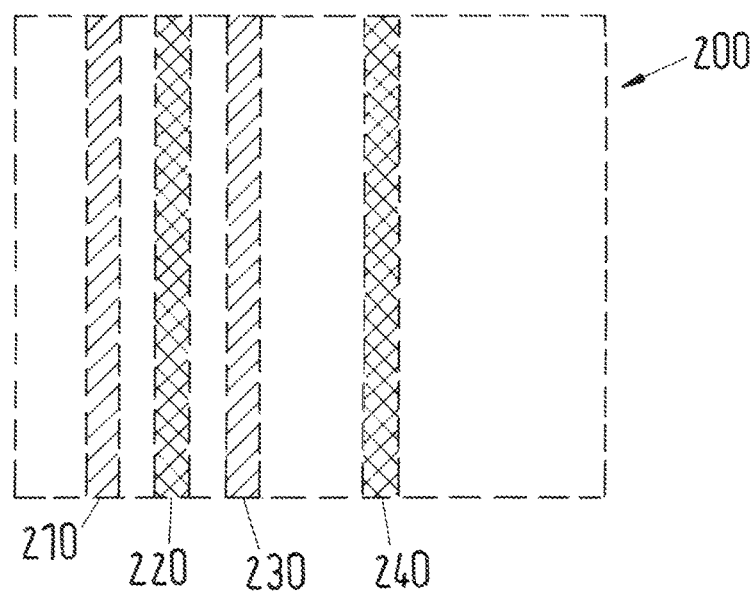
Figure 2:
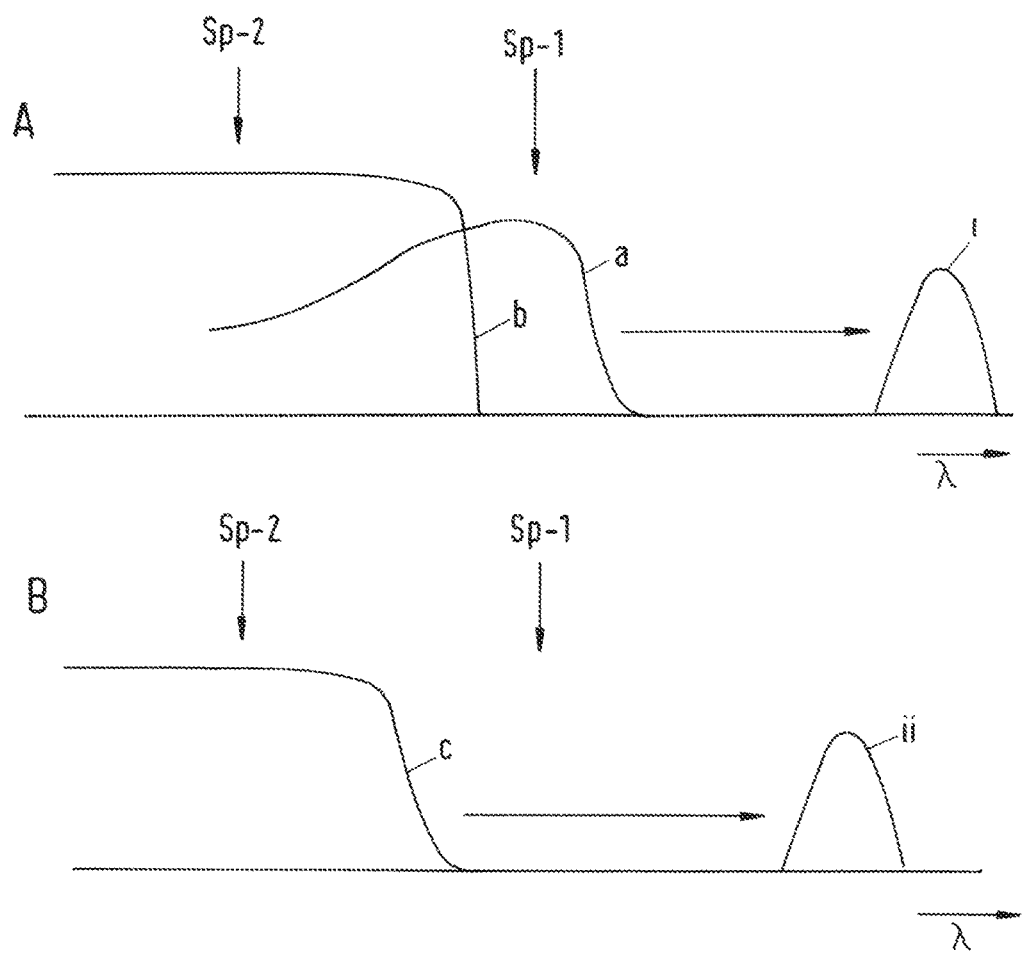
Figure 5:
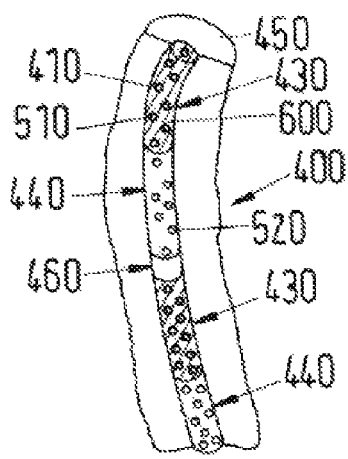
Figure 6:
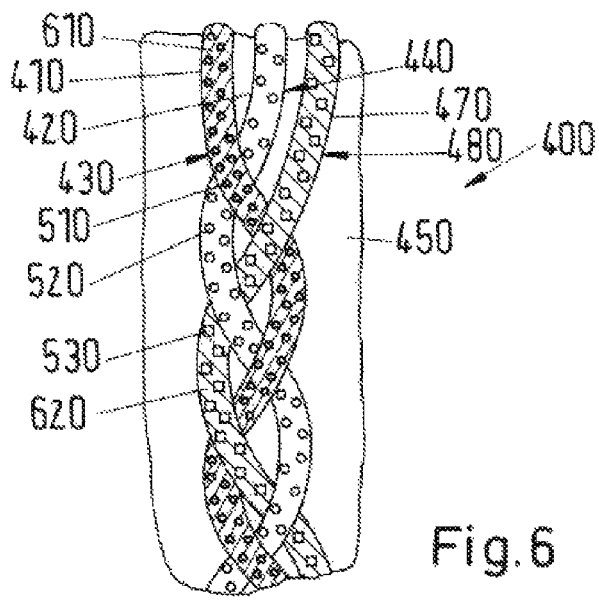
Figure 7:
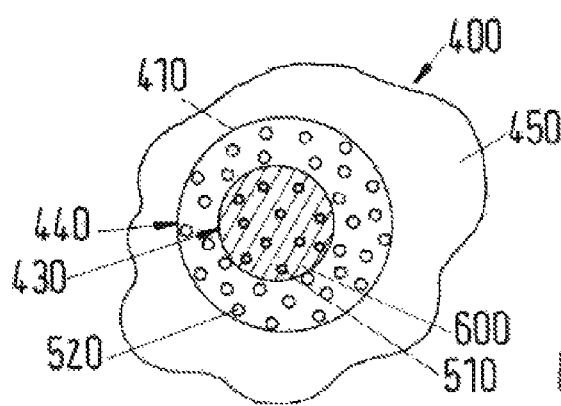
Figure 8:
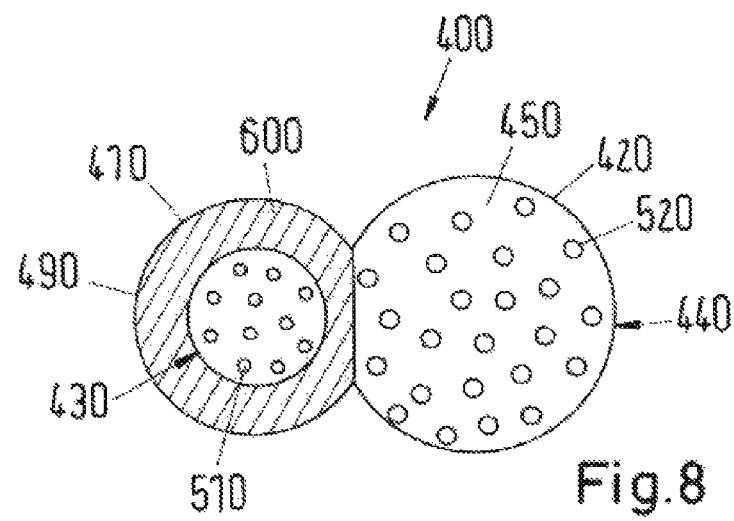
Figure 9:
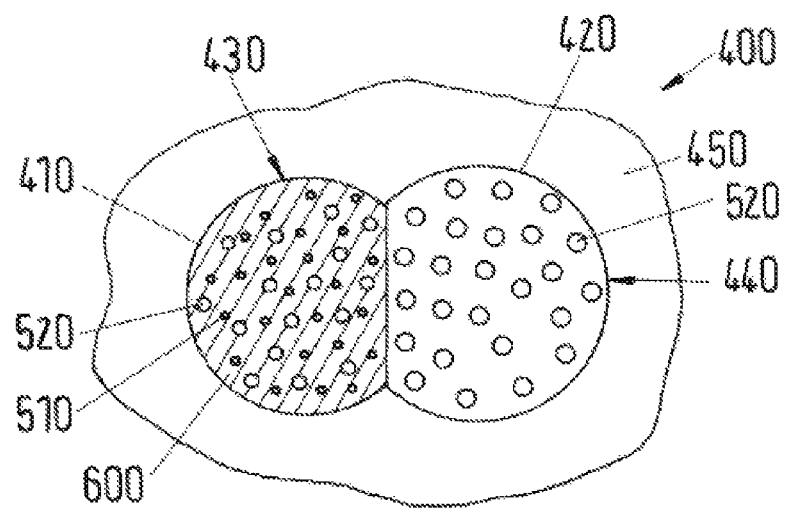

Below, the present invention is explained in further detail in reference to figures, wherein the represented examples have merely exemplary character and do not represent a limitation of the scope of the described invention. Individually, the figures show:

FIG. 1: a diagrammatic isometric representation of a value or security document in the form of a personalized card with a security feature having security elements according to the invention;

FIG. 1A: a diagrammatic view of a security feature in a variant relative to the embodiment shown in FIG. 1;

FIG. 2: a representation of the excitation of two luminescence means in two different element areas under different excitation conditions in a wavelength diagram;

FIG. 3: a diagrammatic view of a colored fiber in longitudinally sectioned representation in a first embodiment;

FIG. 4: a diagrammatic cross section through the colored fiber of FIG. 3;

FIG. 5: a diagrammatic view of a colored fiber in a longitudinally sectioned representation in a second embodiment;

FIG. 6: a diagrammatic view of a colored fiber in a longitudinally sectioned representation in a third embodiment;

FIG. 7: a diagrammatic cross section through a colored fiber in a fourth embodiment;

FIG. 8: a diagrammatic cross section through a colored fiber in a fifth embodiment;

FIG. 9: a diagrammatic cross section through a colored fiber in a sixth embodiment.

In the figures, identical reference numerals designate elements having the same function or the same elements.

FIG. 1 represents a value or security document 100 in the form of a card which is a security document having a security feature 200. This security card can be formed, for example, as a laminate 105 made of several layers that consist substantially of polycarbonate. The laminate forms a substrate for the application of a security feature made of security elements according to the invention, for example, colored fibers or planchettes, wherein the security elements can be arranged on the surface of the document or within the document on a film forming the layers of the document. The document has a front side 101 and a back side (not visible). Individual ones of these layers can be dyed opaquely with pigments. The card has, for example, the format ID 1 according to ISO/IEC 7810. The card can have a thickness of 800 µm, for example. In addition to other security features, such as a facial image 102 of the card owner on a passport photograph 300 and two data fields 103, 104 in which individual information on the owner is stored printed in clear text and/or in coded form, the card has the security feature having the security element according to the invention.

In the embodiment shown in FIG. 1, the security feature 200 containing the security elements 400 according to the invention partially overlaps with the passport photograph 300 and the data field 103. As a result, a manipulation of the passport photograph and of the data field can be detected subsequently. The security elements, here colored fibers, are arranged in the most regular possible distribution in the field provided for this purpose, wherein their alignment is, however, disordered.

In an alternative design of the security feature 200, the security elements 400, for example, colored fibers, are arranged in strip-shaped fields 210, 220, 230, 240 arranged separate from one another and extending parallel to one another, in a barcode-like arrangement (FIG. 1A). The colored fibers are again arranged uniformly within these fields, but in a disordered distribution with regard to their alignment (colored fibers not shown). In the fields 210, 230, colored fibers according to the invention of a first type are contained, and in the fields 220, 240 colored fibers according to the invention of a second type are contained.

The colored fibers of these two types can be biluminescent colored fibers, for example, as described below in the figure description and as represented in FIGS. 3, 4, 5, 6, 7, 8 and 9. These types can differ, for example, with regard to the luminescence means and absorber means contained therein, so that under illumination with electromagnetic radiation of different energy, a different appearance of the colored fibers in the fields is also obtained. For example, the colored fibers in the fields 210, 230 can luminesce when excited with excitation radiation at the energies $E_1$ and $E_2$, and the colored fibers in the fields 220, 240 can luminesce when excited with excitation radiation at the energies $E_3$ and $E_4$, which are different from $E_1$ and $E_2$.

A security element 400 of the type according to the invention in a first embodiment is shown in FIG. 3. This security element is formed by a colored fiber which consists of a strand made of two filaments 410, 420 extending parallel to one another and of a sheathing 450 made of an adhesive material and surrounding said filaments. This colored fiber can have a length of 2 mm, for example. Each of the two filaments can have a diameter of 50 μm, for example. For example, the two filaments are made of polyamide, PA6.6, for example. The colored fiber can be produced, for example, by an extrusion method in which polyamide granulate is melted and then extruded through spinnerets arranged next to one another, so that the two filaments are formed and connected to one another due to their initial tackiness at elevated temperature. An adhesive coating 450 encasing this double filament can be formed by a hot melt adhesive or a reactive adhesive. For the production of the adhesive coating around the double filament, the adhesive material is extruded simultaneously with the two filaments from additional spinnerets arranged around the two spinnerets for the filaments, so that the adhesive material comes to be applied regularly around the double filament. After the production of the extrusion strand, the said strand can be chopped into short segments, resulting in colored fibers having a certain length.

The structure of this colored fiber 400 is represented diagrammatically in cross section in FIG. 4. The first filament 410 forms a first element area 430 and the second filament 420 forms a second element area 440. The two element areas each extend over the entire length of the filaments. In the first filament 410 and thus the first element area 430, there are pigment particles of a first luminescence means 510, for example, of a pigment that can be excited by UV-A radiation, for example, Lumilux® 740 (Honeywell) at a concentration of, for example, 3% by weight relative to the filament material, which luminesces red when excited by UV-A radiation. In addition, the first filament contains, finely distributed, an absorber means 600 which absorbs electromagnetic radiation in the UV-B and UV-C range. It is, for example, microscale or nanoscale ZnO at a concentration of 1% by weight relative to the filament material. In the second filament 420 and thus in the second element area 440, there are pigment particles of a second luminescence means 520, for example, of a pigment that can be excited by UV-C radiation, for example, $ZnSiO_4$:Mn (doped) at a concentration of, for example, 5% by weight relative to the filament material.

Since UV-C radiation is absorbed very strongly by various materials, including the material of the card 100, the colored fibers forming the security feature are arranged in the immediate vicinity of the surface of the card, for example, immediately beneath the thin top coat of lacquer.

Before the lamination, these security elements 400 (colored fibers) have been scattered preferably onto a surface of the laminate from which the card 100 is produced, wherein as regular as possible a distribution is achieved, which is, however, statistical with regard to the alignment of the elements (FIG. 1). By heating the laminate film at the time of the application by scattering, the hot melt adhesive material of the security element softens, so that said security elements are attached to the film. If the adhesive is a reactive adhesive, the film onto which the colored fibers have been scattered is illuminated with appropriate radiation, for example, UV radiation, in order to cure the adhesive and thus establish a connection with the film.

The operating mode of the security elements is further explained in reference to FIG. 2.

In FIG. 2, for the two element areas 430 (area A) and 440 (area B), the absorption of the respective luminescence means 510, 520 or of the absorber means 600 as a function of the excitation wavelength λ is presented.

In the upper representation, the conditions for the area A (element area 430) are reproduced. The area A contains a pigment luminescent substance as first luminescence means 510 (pigment Lumilux® 740 (Honeywell)), which luminesces red and has an absorption in the UV-A range (curve a). In addition, the area A contains an absorber means 600 (ZnO) which absorbs in the UV-B and UV-C range (curve b). In case of irradiation of electromagnetic radiation in the UV-A range (first excitation conditions Sp-1), said radiation is absorbed by the first luminescence means, so that said luminescence means luminesces in the visible spectral range (curve i). In the case of irradiation of electromagnetic radiation in the UV-B or UV-C range (second excitation conditions Sp-2), this radiation is absorbed by the absorber means, so that it cannot be absorbed by the first luminescence means. As a result the first luminescence means 510 located in the first element area 430 does not luminesce under these excitation conditions (Sp-2).

In the lower representation, the conditions for the area B (element area 440) are reproduced: The area B contains the second luminescence means 520 ($ZnSiO_4$:Mn), which luminesces green and which has an absorption in the UV-B and UV-C range (curve c). This area contains no absorber means 600. In the case of irradiation of electromagnetic radiation in the UV-A range (first excitation conditions Sp-1), this radiation is not absorbed by the second luminescence means. On the other hand, in the case of irradiation of electromagnetic radiation in the UV-B or UV-C range (second excitation conditions Sp-2), this radiation is absorbed by the second luminescence means, so that this second element area 440 luminesces green (curve ii).

By irradiation of electromagnetic radiation of different energy (UV-A, first excitation conditions Sp-1, on the one hand, or UV-B/UV-C, second excitation conditions Sp-2, on the other hand), the two element areas A, B (430, 440) luminesce in different colors, namely with the pure luminescence colors of the respective luminescence means 510, 520. In this way, a luminescence switchability is created.

In FIG. 5, a second embodiment of a security element 400 according to the invention in the form of a colored fiber is shown. This fiber is formed from a single filament 410, which is surrounded by an adhesive sheathing 450. The adhesive again can be a hot melt adhesive or also a reactive adhesive. It is used to firmly anchor the fibers in the value or security document 100. Multiple element areas 430, 440 are formed in the filament, which, together with areas 460 that contain no luminescence means, alternatingly follow one another in the axial direction. In the first element areas 430, pigment particles of a first luminescence means 510 as well as an absorber means 600 are contained, and in the second element areas 440, pigment particles of a second luminescence means 520 are contained.

As in the case of the first embodiment, which is shown in FIGS. 3, 4, only the first element areas 430 luminesce red, for example, when excited with a UV-A radiation (first excitation conditions Sp-1) since the first luminescence means 510 contained therein is formed, for example, by the pigment Lumilux® 740 (Honeywell) which absorbs this radiation, and an excitation of the second luminescence means 520, formed, for example, by the pigment $ZnSiO_4$:Mn (doped), in the second element areas 440 is not possible due to absence of absorption of UV-A radiation. On the other hand, in the case of an excitation with UV-B or UV-C radiation (second excitation conditions Sp-2), only the second element areas 440 luminesce green, for example, since the pigment $ZnSiO_4$:Mn (doped) which absorbs this radiation is contained there, and since an excitation of the first luminescence means 510 is not possible due to the absorber means 600 contained in the first element areas 410. Under no excitation conditions do the areas 460 luminesce.

In FIG. 6, a third embodiment of a security element 400 according to the invention in the form of a colored fiber with three different filaments 410, 420, 470 is shown, which in each case form element areas 430, 440, 480 each extending over the entire filament. The individual filaments are interwoven with one another. The filaments can be formed from PA6.6, for example. The filament strand made from the three filaments is surrounded, in addition, with an adhesive coating 450 made from a hot melt adhesive or a reactive adhesive, for example.

In this embodiment, the first filament 410 forms a first element area 430. The second filament 420 forms a second element area 440, and the third filament 470 forms a third element area 480. Each one of these filaments contains a luminescence means, namely the first filament 410 contains a first luminescence means 510, the second filament 420 contains a second luminescence means 520, and the third filament 470 contains a third luminescence means 530. The first luminescence means 510 absorbs radiation in the UV-A, UV-B and in the UV-C range. The second luminescence means 520 absorbs radiation exclusively in the UV-C range, and the third luminescence means 530 absorbs radiation exclusively in the UV-B and in the UV-C range. Furthermore, the first filament 410 contains a first absorber means 610 and the third filament 470 contains a second absorber means 620.

The first and the second absorber means 610, 620 absorb UV-C radiation, so that, in the case of excitation of the colored fiber 400 with UV-C radiation (third excitation conditions Sp-3), the second luminescence means 520 in the second filament 420 luminesces exclusively. The first absorber means 610 additionally absorbs UV-B radiation, so that, in addition, in the case of excitation of the colored fiber with UV-B radiation (second excitation conditions Sp-2), the third luminescence means 530 in the third filament 470 luminesces exclusively. In the case of irradiation of UV-A radiation (first excitation conditions Sp-1), only the first luminescence means 510 in the first filament 410 thus luminesces, since this radiation is not capable of exciting the two other luminescence means 520, 530. In the case of irradiation of UV-B radiation, furthermore, only the third luminescence means 530 in the third filament 470 luminesces, since the first absorber means 610 in the first filament 410 absorbs this radiation and thus prevents the excitation of the first luminescence means 510 in this filament, and since this radiation, in addition, is not capable of exciting the second luminescence means 520 in the second filament 420. Thus, finally, in the case of irradiation of UV-C radiation, only the second luminescence means 520 in the second filament 420 luminesces, since the two absorber means 610, 620 in the two other filaments 410, 470 absorb this radiation and thus prevent the excitation of the luminescence means 510, 530 contained therein.

In yet another embodiment, which is shown in cross section in FIG. 7, a filament 410 of a colored fiber 400 comprises an inner first element area 430 and a second element area 440 surrounding the former element area. The two areas of the filament can be formed from PA6.6, for example. Furthermore, this filament can be surrounded by an adhesive coating 450 which is formed by a hot melt adhesive or by a reactive adhesive, for example.

The first element area 430 contains, for example, pigment particles of a first luminescence means 510 which absorbs, for example, in the UV-A range (first excitation conditions Sp-1), as well as an absorber means 600, which absorbs in the UV-B and UV-C range. This luminescence means can again be the pigment Lumilux® 740 (Honeywell) and the absorber means can be ZnO. In the second element area 440, there are pigment particles of a second luminescence means 520, for example, which is excited in the UV-C range (second excitation conditions Sp-2). The pigment particles can again be $ZnSiO_4$:Mn (doped). In the case of excitation of the colored fiber 400 with UV-A radiation, only the first luminescence means 510 in the first element area 430 is excited to luminesce red. On the other hand, in the case of irradiation of UV-C radiation, the second luminescence means 520 in the second element area 440 is excited exclusively to luminesce green, since the absorber means 600 in the first element area 430 prevents the excitation of the first luminescence means 510.

In yet another (fifth) embodiment, two filaments 410, 420 form a colored fiber 400 (FIG. 8). These two filaments extend parallel to one another and are connected to one another. The second filament 420 is formed by a hot melt adhesive or a reactive adhesive, for example. The first filament 410 is formed from PA6.6, for example. The first filament consists of a core which forms a first element area 430 and which extends over the entire length of the colored fiber. In the first element area, for example, pigment particles of a first luminescence means 510 are located, for example, Lumilux® 740 (Honeywell). This luminescence means absorbs exclusively in the UV-A range (first excitation conditions Sp-1). In a sheathing 490 surrounding the first element area, which can also be formed from PA6.6, a first absorber means 600 is contained, which absorbs in the UV-B and UV-C range, for example, ZnO. The second filament 420 forms a second element area 440 which also extends over the entire length of the colored fiber and in which, for example, pigment particles of a second luminescence means 520, for example, ZnSiO$_4$:Mn (doped), are contained. By irradiation of UV-C radiation (second excitation conditions Sp-2), the second luminescence means luminesces green in this element area. In this case, the adhesive thus forms the second element area 440. In addition, the absorber means is not contained in an element area which contains a luminescence means, but rather is contained in the shielding area 490 which thus shields the first element area 430 against the irradiation of higher energy radiation.

In FIG. 9, yet another (sixth) embodiment of the present invention, which is formed by a security element 400 in the form of a colored fiber, is represented in cross section. In this case, the colored fiber is formed by two filaments 410, 420 which extend parallel to one another and are connected to one another. The two filaments can be formed from PA6.6, for example. This double filament is additionally sheathed with an adhesive coating 450 made from a hot melt or reactive adhesive, for example.

The first filament 410 forms a first element area 430 which extends over the entire length of the colored fiber 400 and which contains, for example, pigment particles of a first luminescence means 510 which absorbs in the UV-A range, for example, and which is, for example, Lumilux® 740 (Honeywell), as well as, for example, pigment particles of a second luminescence means which absorbs, for example, exclusively in the UV-C range, for example, ZnSiO$_4$:Mn (doped), as well as an absorber means 600 which absorbs in the UV-B and UV-C range. The second filament 420 forms a second element area 440 which also extends over the entire length of the colored fiber. This filament contains exclusively the pigment particles of the second luminescence means 520.

In the case of an excitation of the colored fiber 400 with UV-A radiation (first excitation conditions Sp-1), the first luminescence means 510 in the first filament 410 luminesces exclusively, since the second luminescence means 520 in the first filament 410 and in the second filament 420 cannot be excited under these conditions. Therefore, under these first excitation conditions Sp-1, the colored fiber exhibits a red luminescence in the first element area 430, i.e., in the area of the first filament. In the case of an excitation of the colored fiber with UV-C radiation (second excitation conditions Sp-2), the second luminescence means 520 in the second filament 420 luminesces exclusively, since the absorber means 600 in the first filament 410 prevents the absorption of this radiation both by the first luminescence means 510 and also by the second luminescence means 520 and thus their excitation to luminescence. Thus, the colored fiber, under these excitation conditions Sp-2, exhibits a green luminescence exclusively in the second element area 440, i.e., in the area of the second filament.

REFERENCE NUMERALS

100 Value or security product, value or security document, security card
102 Facial image
103 Data field
104 Data field
105 Laminate
200 Security feature
210 Strip-shaped field
220 Strip-shaped field
230 Strip-shaped field
240 Strip-shaped field
300 Passport photograph
400 Security element, colored fiber
410 (First) filament
420 (Second) filament, adhesive area
430 First element area (area A)
440 Second element area (area B)
450 Adhesive, (adhesive) sheathing, adhesive coating
460 Element area without luminescence means
470 Third filament
480 Third element area
490 Sheathing, shielding area
510 First luminescence means
520 Second luminescence means
530 Third luminescence means
600 Absorber means
610 First absorber means
620 Second absorber means
a Wavelength dependency of the absorption of the first luminescence means
b Wavelength dependency of the absorption of the absorber means
c Wavelength dependency of the absorption of the second luminescence means
i Wavelength dependency of the luminescence of the first luminescence means
ii Wavelength dependency of the luminescence of the second luminescence means
Sp-1 First excitation condition
Sp-2 Second excitation condition
Sp-3 Third excitation condition

The invention claimed is:

1. A multi-luminescent security element comprising:
(a) a first luminescence means having a first excitation spectrum;
(b) a second luminescence means having a second excitation spectrum, wherein the second excitation spectrum does not completely overlap with the first excitation spectrum; and
(c) an absorber means that absorbs electromagnetic radiation at the second excitation spectrum but does not absorb electromagnetic radiation having a wavelength in a wavelength range within the first excitation spectrum that does not fall within the second excitation spectrum;
(d) wherein the first luminescence means is excitable by radiation of both the first excitation spectrum and the second excitation spectrum, and wherein in said security element said absorber means absorbs radiation of the second excitation spectrum by which the first luminescence means is excitable by, to prevent excitation of said first luminescence means by radiation of the second excitation spectrum such that said first luminescence means is only excitable by the radiation having a wavelength having a wavelength within the first excitation spectrum that does not fall within the second excitation spectrum, and wherein the second excitation spectrum, and wherein the second luminescence means is excitable by radiation of the second excitation spectrum.

2. The security element of claim 1, further comprising two element volume areas spatially separate from one another, wherein the first luminescence means is contained in a first element volume area and the second luminescence means is contained in a second element volume area.

3. The security element of claim 2, wherein the first element volume area comprises the absorber means.

4. The security element of claim 2, wherein the first element area is surrounded by a shielding area comprising the absorber means.

5. The security element of claim 1, further comprising an adhesive.

6. The security element of claim 1, further comprising a filament comprising at least two element areas, the element areas being separate from one another in the longitudinal direction of the filament and/or arranged concentric to one another.

7. The security element of claim 1, further comprising (i) two filaments connected to one another or (ii) a filament and an adhesive area wherein an element area is formed by at least some of the filament(s) and/or adhesive area.

8. The security element of claim 1, wherein the first excitation spectrum is from 315 to 380 nm and the second excitation spectrum includes one or both of 200 to 280 nm and 280 to 315 nm.

9. A value or security product comprising the security element of claim 1.

10. The security element of claim 1, wherein the first luminescence means is present in a first volume area and the absorber means is present in the first volume area and/or completely surrounds the first volume area, thus preventing the excitation of the first luminescence means when the security element is excited with radiation having a wavelength within the second excitation spectrum.

11. The security element of claim 10, wherein the second luminescence means is present in a second volume area that does not contain the absorber means and is not completely surrounded by the absorber means.

\* \* \* \* \*